US012286334B2

(12) United States Patent
Schmidt et al.

(10) Patent No.: US 12,286,334 B2
(45) Date of Patent: *Apr. 29, 2025

(54) MOBILE TRANSPORT SYSTEM

(71) Applicant: SEW-EURODRIVE GMBH & CO. KG, Bruchsal (DE)

(72) Inventors: Josef Schmidt, Philippsburg-Huttenheim (DE); Andreas Tuskan, Walzbachtal (DE)

(73) Assignee: SEW-EURODRIVE GMBH & CO. KG, Bruchsal (DE)

(*) Notice: Subject to any disclaimer, the term of this patent is extended or adjusted under 35 U.S.C. 154(b) by 496 days.

This patent is subject to a terminal disclaimer.

(21) Appl. No.: 17/910,592

(22) PCT Filed: Feb. 18, 2021

(86) PCT No.: PCT/EP2021/025057
§ 371 (c)(1),
(2) Date: Sep. 9, 2022

(87) PCT Pub. No.: WO2021/180360
PCT Pub. Date: Sep. 16, 2021

(65) Prior Publication Data
US 2023/0166954 A1 Jun. 1, 2023

(30) Foreign Application Priority Data
Mar. 9, 2020 (DE) .................. 102020001491.7

(51) Int. Cl.
B66F 9/06 (2006.01)
B60K 7/00 (2006.01)
B66F 9/075 (2006.01)

(52) U.S. Cl.
CPC ............ B66F 9/063 (2013.01); B60K 7/0007 (2013.01); B66F 9/07586 (2013.01);
(Continued)

(58) Field of Classification Search
CPC .... B66F 9/063; B66F 9/07586; B60K 7/0007; B60Y 2200/40; B60Y 2200/62; B60Y 2200/66; B60Y 2200/86; B60Y 2200/91
See application file for complete search history.

(56) References Cited

U.S. PATENT DOCUMENTS 3,612,206 A * 10/1971 Ohntrup ............... G05D 1/0265
318/587
4,128,137 A * 12/1978 Booth ...................... B62D 7/00
180/907

(Continued)

FOREIGN PATENT DOCUMENTS

DE 2707541 A1 9/1977
DE 102012025152 A1 6/2014
(Continued)

OTHER PUBLICATIONS

International Search Report issued in corresponding International Application No. PCT/EP2021/025057 dated Jun. 14, 2021, pp. 1-2, English Translation.

(Continued)

Primary Examiner — Jacob B Meyer
(74) Attorney, Agent, or Firm — Carter, DeLuca & Farrell LLP

(57) ABSTRACT

A mobile transport system includes a vehicle frame, first and second pairs of support wheels, first and second drive wheels, and a swing frame. A drive unit including a drive frame is disposed on the swing frame. The first drive wheel is rotatably supported on a first swing arm, and the second drive wheel is rotatably supported on a second swing arm. The first and second swing arms are coupled to each other by a coupling unit, such that a pivot motion of the first swing arm about a first swing axis in a first pivot direction brings about a pivot motion of the second swing arm about a second (Continued)

swing axis in a second pivot direction oriented opposite to the first pivot direction.

20 Claims, 5 Drawing Sheets

(52) U.S. Cl.
CPC ....... *B60Y 2200/40* (2013.01); *B60Y 2200/62* (2013.01); *B60Y 2200/66* (2013.01); *B60Y 2200/86* (2013.01); *B60Y 2200/91* (2013.01)

(56) References Cited

U.S. PATENT DOCUMENTS

| | | | | |
|---|---|---|---|---|
| 4,245,847 | A * | 1/1981 | Knott | A61G 5/06 |
| | | | | 280/5.2 |
| 4,529,052 | A * | 7/1985 | Imai | B62D 9/00 |
| | | | | 180/23 |
| 4,575,235 | A * | 3/1986 | Powers | G03B 27/20 |
| | | | | 355/99 |
| 6,196,343 | B1 * | 3/2001 | Strautnieks | A61G 5/043 |
| | | | | 180/22 |
| 7,293,801 | B2 * | 11/2007 | Bertrand | B60G 17/016 |
| | | | | 280/755 |
| 7,296,643 | B2 * | 11/2007 | Philipson | B60K 7/0007 |
| | | | | 180/21 |
| 8,596,652 | B2 * | 12/2013 | Tong | B62D 63/065 |
| | | | | 180/220 |
| 9,072,218 | B2 * | 7/2015 | Johnson | G05D 1/0265 |
| 9,707,879 | B2 * | 7/2017 | Mecklinger | B66F 9/063 |
| 10,336,380 | B2 * | 7/2019 | Sakashita | B62D 21/18 |
| 2004/0070159 | A1 * | 4/2004 | Perelli | B62B 5/0083 |
| | | | | 280/47.35 |
| 2017/0080846 | A1 * | 3/2017 | Lord | B60K 7/0007 |
| 2019/0291528 | A1 * | 9/2019 | Pajevic | B60P 1/6445 |
| 2019/0322505 | A1 * | 10/2019 | Tengvert | B62D 61/04 |
| 2023/0150350 | A1 * | 5/2023 | Schmidt | B60K 7/00 |
| | | | | 180/168 |
| 2023/0166793 | A1 * | 6/2023 | Degen | B62D 7/04 |
| | | | | 701/41 |
| 2023/0166954 | A1 * | 6/2023 | Schmidt | B66F 9/07586 |
| | | | | 180/168 |

FOREIGN PATENT DOCUMENTS

| | | |
|---|---|---|
| DE | 102013013438 A1 | 2/2015 |
| DE | 102013019726 A1 | 5/2015 |
| DE | 102014015317 A1 | 4/2016 |
| DE | 102017201108 A1 | 7/2018 |
| EP | 2826693 A2 | 1/2015 |
| JP | 2005306178 A | 11/2005 |
| WO | 2018136987 A1 | 8/2018 |
| WO | 2019020862 A1 | 1/2019 |

OTHER PUBLICATIONS

International Report on Patentability issued in corresponding International Application No. PCT/EP2021/025057 dated Sep. 6, 2022, pp. 1-7, English Translation.

* cited by examiner

MOBILE TRANSPORT SYSTEM

FIELD OF THE INVENTION

The present invention relates to a mobile transport system, for example, for transporting objects, e.g., in a technical system, including a vehicle frame, a pair of first support wheels and a pair of second support wheels rotatably supported, a first drive wheel rotatable about a first drive axis, a second drive wheel rotatable about a second drive axis, and a swing frame pivotable about a swing axis relative to the vehicle frame.

BACKGROUND INFORMATION

In technical systems, for example, in production plants, mobile transport systems, e.g., autonomously driving mobile transport systems, are used for transporting objects such as small parts or crates. The mobile transport systems bring components, among other things, from logistics areas, such as a material warehouse, to workstations where the components are processed. Generic mobile transport systems are able to overcome slight pitches or slopes and small ground sills or similar obstacles.

A mobile transport system is described in German Patent Document No. 10 2017 201 108 and is implemented as an industrial truck, including a first support wheel at a front end, a second support wheel at a rear end, and a drive wheel disposed between the support wheels. The first support wheel is disposed on a driving frame, while the second support wheel and the drive wheel are disposed on a swing frame. The swing frame is hinged on the driving frame by a horizontal swing axis.

German Patent Document No. 10 2012 025 152 describes an automated guided transport system including steering rollers and a drive unit disposed on a supporting part. The drive unit includes a wheel driven by an electric motor and is displaceable relative to the supporting part by a linear actuator.

A vehicle is described in German Patent Document No. 10 2013 019 726 and includes a frame on which a plurality of steering units are rotatably supported. The steering units each include a drive wheel, the wheel axis thereof being rotatably supported in a wheel axle support, the wheel axle support being rotatably supported by a swing axis.

German Patent Document No. 10 2014 015 317 describes a vehicle having a frame on which a receiving part is guided by a linear guide. The vehicle further includes a drive unit including drive wheels rotatably supported on a swing arm by a rotary bearing.

A suspension for transport devices is described in PCT Patent Document No. WO 2018/136987 and includes a wheel support pivotable about a vertical axis of rotation. Two wheels rotatable about a common axis of rotation are disposed on the wheel carrier.

PCT Patent Document No. WO 2019/020862 describes a vehicle including a pair of drive wheels and two pairs of support wheels.

Japanese Patent Document No. 2005-306178 describes an automated guided vehicle. The transport vehicle includes a pair of drive wheels and two pairs of support wheels. German Patent Document No. 10 2013 013 438 describes a transport vehicle for transporting load shelves. The transport vehicle includes a pair of drive wheels and two pairs of support wheels. German Patent Document No. 27 07 541 describes a vehicle running on rails. The vehicle includes three pairs of wheels. European Patent Document No. 2 826 693 describes a transport cart having a suspension. The suspension includes three pairs of wheels.

SUMMARY

Example embodiments of the present invention provide a mobile transport system for transporting objects.

According to an example embodiment of the present invention, a mobile transport system for transporting objects, e.g., in a technical system, includes a vehicle frame, a pair of first support wheels and a pair of second support wheels rotatably supported, a first drive wheel rotatable about a first drive axis extending in a transverse direction, a second drive wheel rotatable about a second drive axis extending in the transverse direction, and a swing frame pivotable about a swing axis relative to the vehicle frame. The first support wheels are disposed on the vehicle frame, and the second support wheels are disposed on the swing frame.

A drive unit including a drive frame is disposed on the swing frame, the first drive wheel is rotatably supported on a first swing arm pivotable about a first swing axis relative to the drive frame, and the second drive wheel is rotatably supported on a second swing arm pivotable about a second swing axis relative to the drive frame. The first swing arm and the second swing arm are coupled to each other by a coupling unit, such that a pivot motion relative to the drive frame of the first swing arm about the first swing axis in a first pivot direction brings about a pivot motion relative to the drive frame of the second swing arm about the second swing axis in a second pivot direction in a second pivot direction directed opposite the first pivot direction.

This arrangement of the mobile transport system makes it possible to compensate for uneven ground areas. The pivot motion of the swing arms about the swing axes when traveling across uneven ground areas ensures that both drive wheels always make contact with the ground and have a sufficiently high contact pressure. The use of springs is not necessary in order to achieve sufficiently high contact pressure of the drive wheels on the ground. The mobile transport system thereby includes rigid kinematics for, e.g., preventing yielding or compliance when traveling across uneven ground areas. An installation space for further components, for example, also remains between the drive wheels.

According to example embodiments, the first drive axle and the second drive axle can be displaced relative to each other perpendicular to the transverse direction. The first drive axis and the second drive axis both extend in the transverse direction and thus are always parallel to each other. Such a displacing of the drive axes relative to each other occurs for a pivot motion of the swing arms about the swing axes. Tilting of the drive wheels for a pivot motion of the swing arms about the swing axes is thereby prevented. For a particular alignment of the swing arms, the drive axes are aligned with each other.

According to example embodiments, the first swing axis extends in the transverse direction and the second swing axis extends in the transverse direction. The first swing axis and the second swing axis are thereby, for example, aligned to each other. The swing axes thus extend parallel to each other and parallel to the drive axes. A pivot motion of the swing arms about the swing axes thus brings about a displacement of one of the drive axes toward the ground and a motion of the other drive axis away from the ground.

According to example embodiments, the coupling unit includes a rocker for pivoting about a coupling axis relative to the drive frame, a first strut, and a second strut, the first swing arm is connected to the rocker by the first strut, and the second swing arm is connected to the rocker by the second strut. A coupling unit having such a configuration can be produced relatively inexpensively and requires only a relatively small installation space.

The coupling axis, for example, extends in a longitudinal direction extending perpendicular to the transverse direction.

According to example embodiments, the drive unit includes a first drive motor for driving the first drive wheel and a second drive motor for driving the second drive wheel. The first drive motor is disposed on the first swing arm, and the second drive motor is disposed on the second swing arm. Gearboxes are, e.g., further provided, by which the drive motors drive the drive wheels. The gearboxes are thereby also disposed on the swing arms. The drive motors and the gearboxes are thereby disposed in an installation space between the drive wheels for saving space.

According to example embodiments, the drive frame is pivotable relative to the swing frame about a steering axis. Due to a pivot motion of the drive frame, the alignment of the drive wheels changes relative to the swing frame and relative to the vehicle frame. A change in the alignment of the swing frame and of the vehicle frame relative to a direction of motion of the mobile transport system can thereby be performed.

The steering axis, for example, extends in a vertical direction extending perpendicular to the transverse direction.

The vertical direction also extends perpendicular to the longitudinal direction.

According to example embodiments, the drive unit includes a swivel attached to the swing frame. The drive frame is pivotable relative to the swivel about the steering axis, and the drive unit includes an actuator motor for driving the drive unit relative the swivel. A gearbox is, for example, further provided, by which the actuator motor drives the drive frame. A change in the alignment of the swing frame and of the vehicle frame relative to a direction of motion of the mobile transport system can thereby be performed by the actuator motor.

According to example embodiments, the drive unit includes a rotary transmitter by which electrical energy and data can be transmitted from the drive frame to the swing frame, and from the swing frame to the drive frame. To this end, the rotary transmitter includes at least one slip ring.

A distance between the second support wheels and the swing axis in a base direction is, e.g., at least approximately equal to a distance between the steering axis and the swing axis in the base direction. The base direction is a horizontal direction and extends perpendicular to the vertical direction.

The swing axis extends in a lateral direction extending perpendicular to the vertical direction and perpendicular to the base direction. The swing axis is thus disposed at least approximately centered between the swing axis and the second support wheels in the base direction. The drive wheels thereby have approximately identical contact pressure on the ground as the second support wheels. By displacing the swing axis in the base direction, the load distribution between the drive wheels and the second support wheels can be adjusted.

The first support wheels are, for example, each supported relative to the vehicle frame rotatably about a first axis of rotation extending in a horizontal direction and relative to the vehicle frame pivotably about a first pivot axis extending in a vertical direction. The second support wheels are also, e.g., each supported relative to the swing frame rotatably about a second axis of rotation extending in a horizontal direction and relative to the swing frame pivotably about a second pivot axis extending in a vertical direction. The vertical direction thereby extends perpendicular to the transverse direction. Horizontal directions extend perpendicular to the vertical direction. Support wheels implemented in such a manner are relatively inexpensive and also facilitate the mobile transport system traveling around curves.

According to example embodiments, one braking device is disposed on each of the two support wheels, by which a rotation of the corresponding second support wheel about a second axis of rotation extending in the horizontal direction can be braked. The braking devices can be electromagnetically actuated, for example. The second support wheels having the braking devices also continuously make contact with the ground. Braking of the mobile transport system is thus possible at all times, approximately independently of the condition of the ground. Additional braking devices at the first support wheels and/or at the drive wheels are not necessary.

According to example embodiments, the drive wheels are disposed between the first support wheels and the second support wheels in a base direction. The base direction is, as previously mentioned, a horizontal direction and extends perpendicular to the vertical direction.

According to example embodiments, a receiving unit is disposed on the drive frame, to which energy can be transferred inductively from a charging unit. The charging unit is implemented as a linear conductor or as a coil, for example, and is stationary and present in the ground. The energy inductively transmitted from the charging unit to the receiving unit serves, for example, for charging an electrical energy store of the mobile transport system.

According to example embodiments, at least one inductive sensor for detecting a magnetic field of a, e.g., linear conductor is disposed on the drive frame. When the magnetic field is generated by a linear conductor arranged in the ground, for example, the inductive sensor provides for following the linear conductor in order to reach a particular destination.

Further features and aspects of example embodiments of the present invention are explained in greater detail below with reference to the appended schematic Figures.

DETAILED DESCRIPTION

Figure 1:
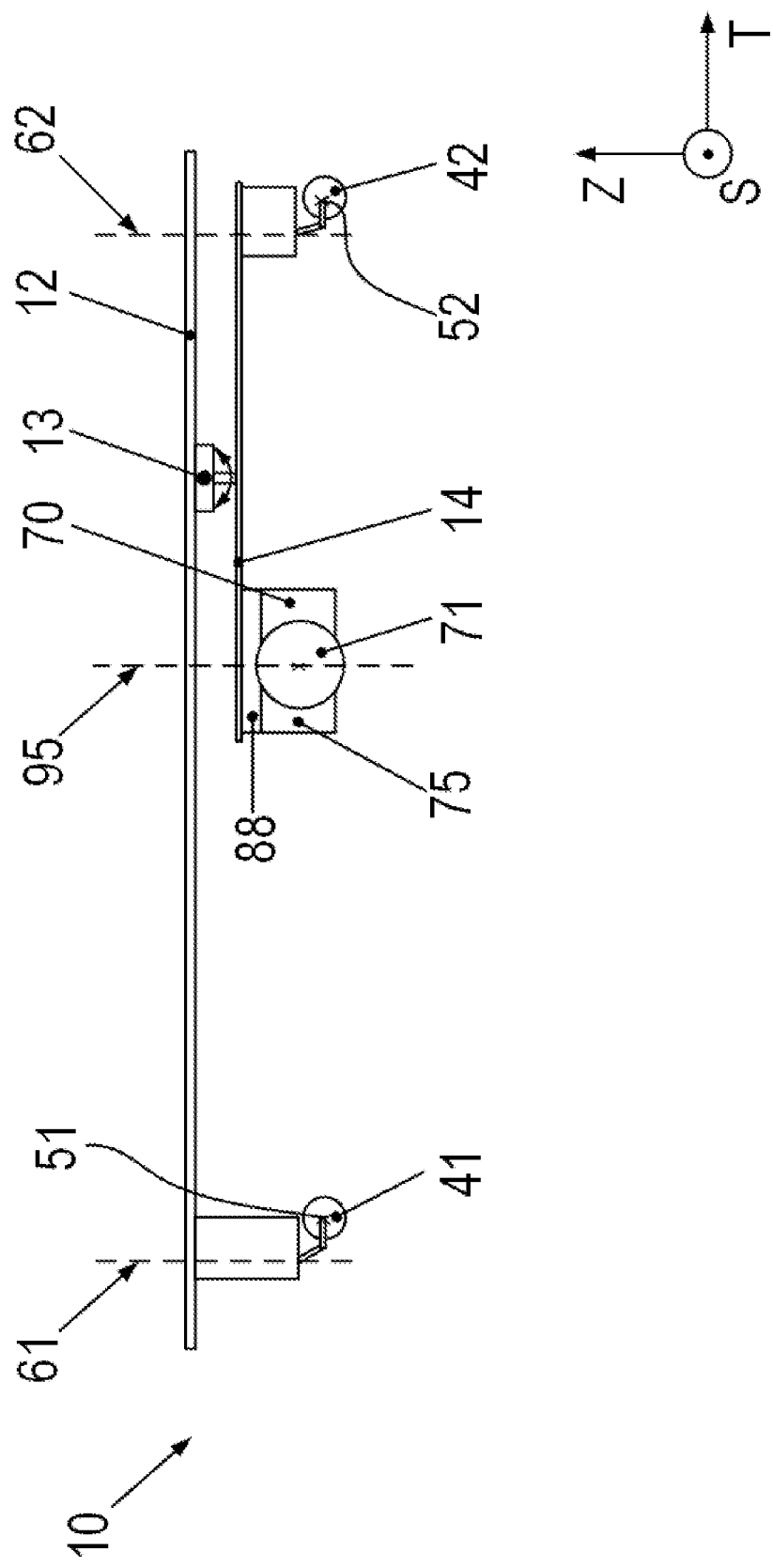
FIG. 1 is a schematic side view of a mobile transport system.

FIG. 1 is a schematic side view of a mobile transport system 10. The mobile transport system 10 is adapted for transporting objects in a technical plant. The technical plant is an industrial application, such as a production plant. The transport system 10 is also adapted, for example, for supplying goods to a residence of a private recipient in a city or in a residential region. The mobile transport system 10 is an automated guided vehicle. As illustrated, the mobile transport system 10 is present on a flat ground within a technical plant.

The mobile transport system 10 includes a vehicle frame 12 and a swing frame 14. The swing frame 14 is pivotable about a swing axis 13 relative to the vehicle frame 12. The swing axis 13 extends in the lateral direction S. The vehicle frame 12 includes an approximately rectangular cross section and extends predominantly in a base direction T and in the transverse direction S.

The base direction T corresponds at least approximately to the usual travel direction of the mobile transport system 10. The lateral direction S extends perpendicular to the base direction T. The base direction T and the lateral direction S are horizontal directions and extend parallel to the flat ground on which the mobile transport system 10 is present. A vertical direction Z is arranged perpendicular on the flat ground and thus extends perpendicular to the base direction T and perpendicular to the lateral direction S. Each direction perpendicular to the vertical direction Z is a horizontal direction.

Two first support wheels 41 are disposed on the vehicle frame 12 and are rotatable relative to the vehicle frame 12. The first support wheels 41 are disposed offset to each other in the lateral direction S. Two second support wheels 42 are disposed on the swing frame 14 and rotatable relative to the swing frame 14. The second support wheels 42 are disposed offset to each other in the lateral direction S.

The first support wheels 41 are each pivotable relative to the vehicle frame 12 about a first pivot axis 61 extending in a vertical direction Z. The first support wheels 41 are each further supported rotatably relative to the vehicle frame 12 about a first axis of rotation 51 extending in a horizontal direction. As illustrated, the first axes of rotation 51 extend in the lateral direction S. Depending on a pivoting of the first support wheels 41 about the first pivot axis 61, the first axes of rotation 51 extend in the base direction T, for example, or in a different horizontal direction. The first pivot axis 61 and the first axis of rotation 51 of a first support wheel 41 do not intersect.

The second support wheels 42 are each pivotable relative to the swing frame 14 about a second pivot axis 62 extending in a vertical direction Z. The second support wheels 42 are each further supported rotatably relative to the swing frame 14 about a second axis of rotation 52 extending in a horizontal direction. As illustrated, the second axes of rotation 52 extend in the lateral direction S. Depending on a pivoting of the second support wheels 42 about the second pivot axis 62, the second axes of rotation 52 extend in the base direction T, for example, or in a different horizontal direction. The second pivot axis 62 and the second axis of rotation 52 of a second support wheel 42 do not intersect.

The mobile transport system 10 includes a drive unit 70 disposed on the swing frame 14. The drive unit 70 includes a drive frame 75 and a swivel 88. The drive frame 75 is pivotable relative to the swivel 88 about a steering axis 95. The swivel 88 is attached to the swing frame 14. The drive frame 75 is thus pivotable relative to the swing frame 14 about a steering axis 95. The drive unit 70 is disposed between the first support wheels 41 and the second support wheels 42 in the base direction T.

The drive unit 70 includes a first drive wheel 71 and a second drive wheel 72, both rotatably supported. As illustrated, the second drive wheel 72 is hidden. The drive wheels 71, 72 are disposed between the first support wheels 41 and the second support wheels 42 in the base direction T. A distance between the second support wheels 42 and the swing axis 13 in a base direction T is at least approximately equal to a distance between the steering axis 95 and the swing axis 13 in the base direction T. The distance between the second support wheels 42 and the swing axis 13 in the base direction T thereby corresponds to the distance between the second pivot axes 62 and the swing axis 13 in the base direction T.

Figure 2:
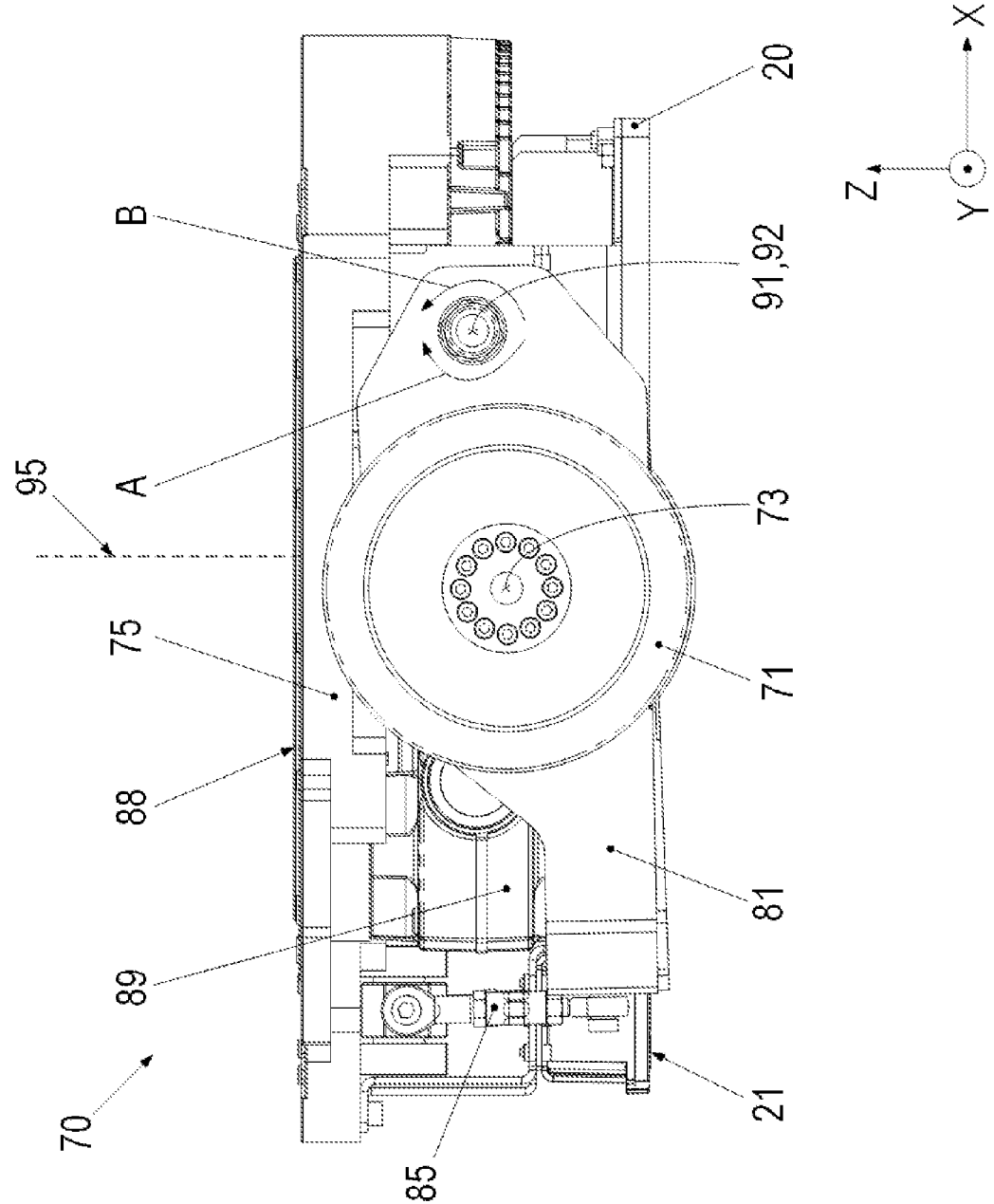
FIG. 2 is a side view of a drive unit.

FIG. 2 is a side view of the drive unit 70. The drive unit 70 includes a first swing arm 81 pivotable relative to the drive frame 75 about a first swing axis 91 and the second swing arm 82 pivotable relative to the drive frame 75 about a second swing axis 92. The first swing axis 91 and the second swing axis 92 extend in a transverse direction Y and are aligned to each other. The swing arms 81, 82 are each pivotable relative to the drive frame 75 in a first pivot direction A and in a second pivot direction B aligned opposite the first pivot direction A about the swing axes 91, 92.

The transverse direction Y extends perpendicular to the vertical direction Z. A longitudinal direction X extends perpendicular to the vertical direction Z and perpendicular to the transverse direction Y. The longitudinal direction X and the transverse direction Y are horizontal directions. Each direction perpendicular to the vertical direction Z is a horizontal direction. As previously mentioned, the drive frame 75 of the drive unit 70 is pivotable relative to the swivel 88 and to the swing frame 14 of the mobile transport system 10 about the steering axis 95. Depending on a pivot motion of the drive frame 75 about the steering axis 95, an alignment of the drive frame 75 changes relative to the vehicle frame 12 and relative to the swing frame 14. As illustrated in FIG. 1, the longitudinal direction X corresponds to the base direction T, and the transverse direction Y corresponds to the lateral direction S.

The first drive wheel 71 is rotatably supported on the first swing arm 81 about a first drive axis 73 extending in the transverse direction Y. The second drive wheel 72 is rotatably supported on the second swing arm 82 about a second drive axis 74 extending in the transverse direction Y. As illustrated, the second drive wheel 72 is hidden. The drive axes 73, 74 thus extend parallel to the swing axes 91, 92 but are offset parallel relative to the same. Due to pivot motions of the swing arms 81, 82 about the swing axes 91, 92, the drive axes 73, 74 are displaceable relative to each other perpendicular to the transverse direction Y.

The drive unit 70 includes a receiving unit 20 disposed on the drive frame 75 and to which energy can be transmitted inductively from a charging unit. The charging unit is implemented as a linear conductor or as a coil, for example. The energy inductively transmitted from the charging unit to the receiving unit 20 serves, for example, for charging an electrical energy store of the mobile transport system 10.

The drive unit 70 further includes an inductive sensor 21 disposed on the drive frame 75. The inductive sensor 21 serves for detecting a magnetic field. When the magnetic field is generated by a linear conductor arranged in the ground, for example, the inductive sensor 21 provides for following the linear conductor in order to reach a particular destination.

Figure 3:
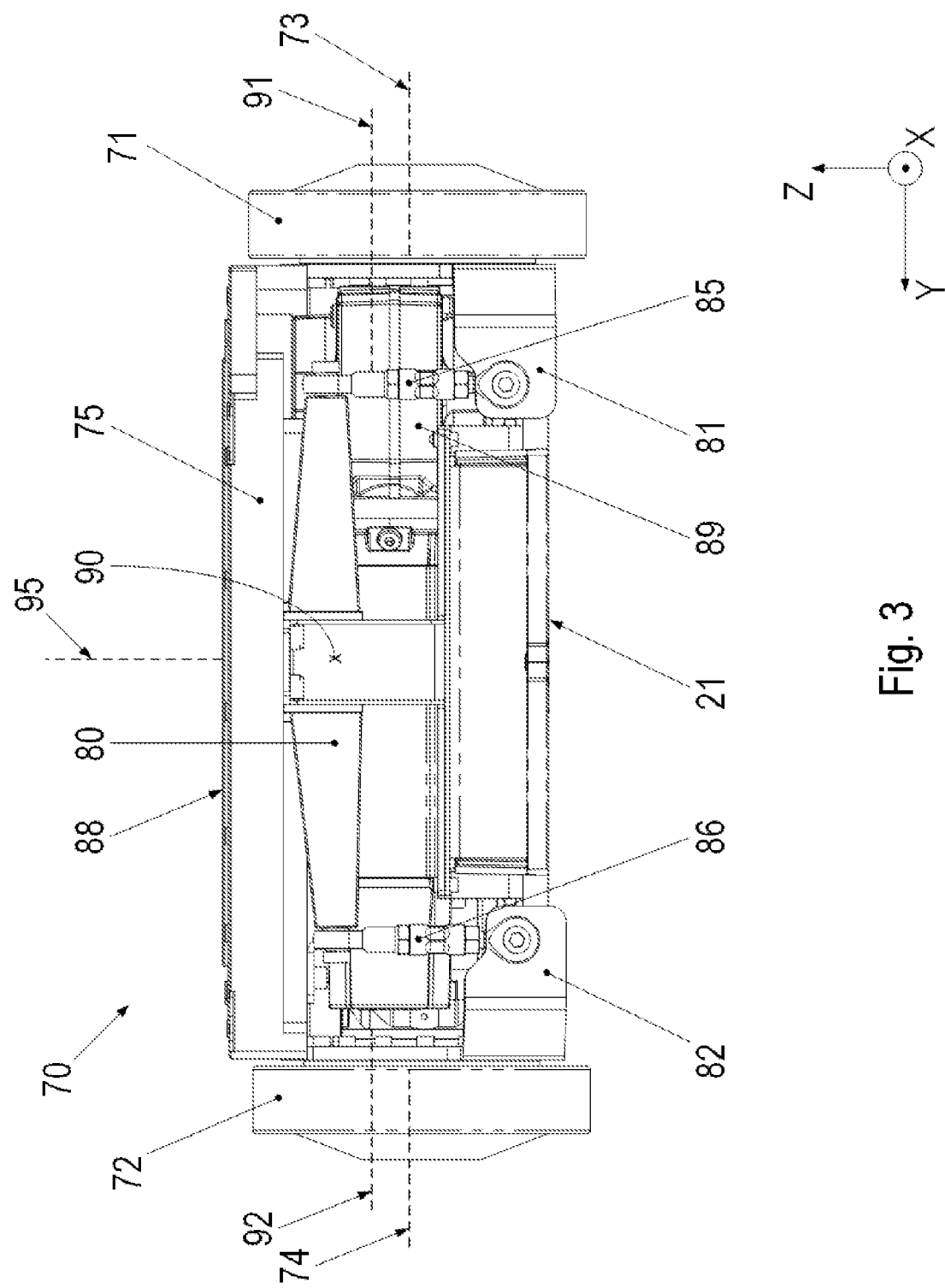
FIG. 3 is a front view of a drive unit.

FIG. 3 is a front view of a drive unit 70. The drive unit 70 includes a coupling unit including a rocker 80 for pivoting about a coupling axis 90 relative to the drive frame 75, a first strut 85, and a second strut 86. The first swing arm 81 is connected to the rocker 80 by the first strut 85. The second swing arm 82 is connected to the rocker 80 by the second strut 86. The coupling axis 90 extends in the longitudinal direction X. The first swing arm 81 and the second swing arm 82 are thus coupled to each other by the coupling unit.

When the first drive wheel 71 travels into a ground protrusion, for example, the first drive wheel 71 is thereby displaced upward in the vertical direction Z. The first swing arm 81 is thereby pivoted about the first swing axis 91 in the first pivot direction A. The first swing arm 81 thereby brings about a pivot motion of the rocker 80 about the coupling axis 90 by the first strut 85. The rocker 80 thereby brings about a pivot motion of the second swing arm 82 about the second swing axis 92 in the second pivot direction B by the second strut 86. The second drive wheel 72 is thereby displaced downward in the vertical direction Z.

For the described procedure, the drive wheels 71, 72 are not displaced exclusively in the vertical direction Z, but also slightly in the longitudinal direction X. Due to the geometric arrangement of the swing arms 81, 82 and the swing axes 91, 92, the motion of the drive wheels 71, 72 in the longitudinal direction is, however, negligible in comparison with the motion in the vertical direction Z.

The first swing arm 81 and the second swing arm 82 are thus coupled to each other by the coupling unit, such that a pivot motion of the first swing arm 81 about the first swing axis 91 in the first pivot direction A brings about a pivot motion of the second swing arm 82 about the second swing axis 92 in the second pivot direction B. The first swing arm 81 and the second swing arm 82 are also coupled to each other by the coupling unit, such that a motion of the first drive wheel 71 upward in the vertical direction Z brings about a motion of the second drive wheel 72 downward in the vertical direction Z, and vice versa.

The first strut 85 and the second strut 86 extent at least approximately in the vertical direction Z. The first strut 85 and the second strut 86 are each adjustable in length independently of each other. This means that an extent of the struts 85, 86 in the vertical direction Z is adjustable.

The drive unit 70 includes a tilt sensor for sensing a tilt of the rocker 80 relative to the drive frame 75 about the coupling axis 90. The drive unit 70 includes a tilt sensor for sensing a tilt of the first swing arm 81 relative to the drive frame 75 about the first swing axis 91. The drive unit 70 includes a tilt sensor for sensing a tilt of the second swing arm 82 relative to the drive frame 75 about the second swing axis 92.

Figure 4:
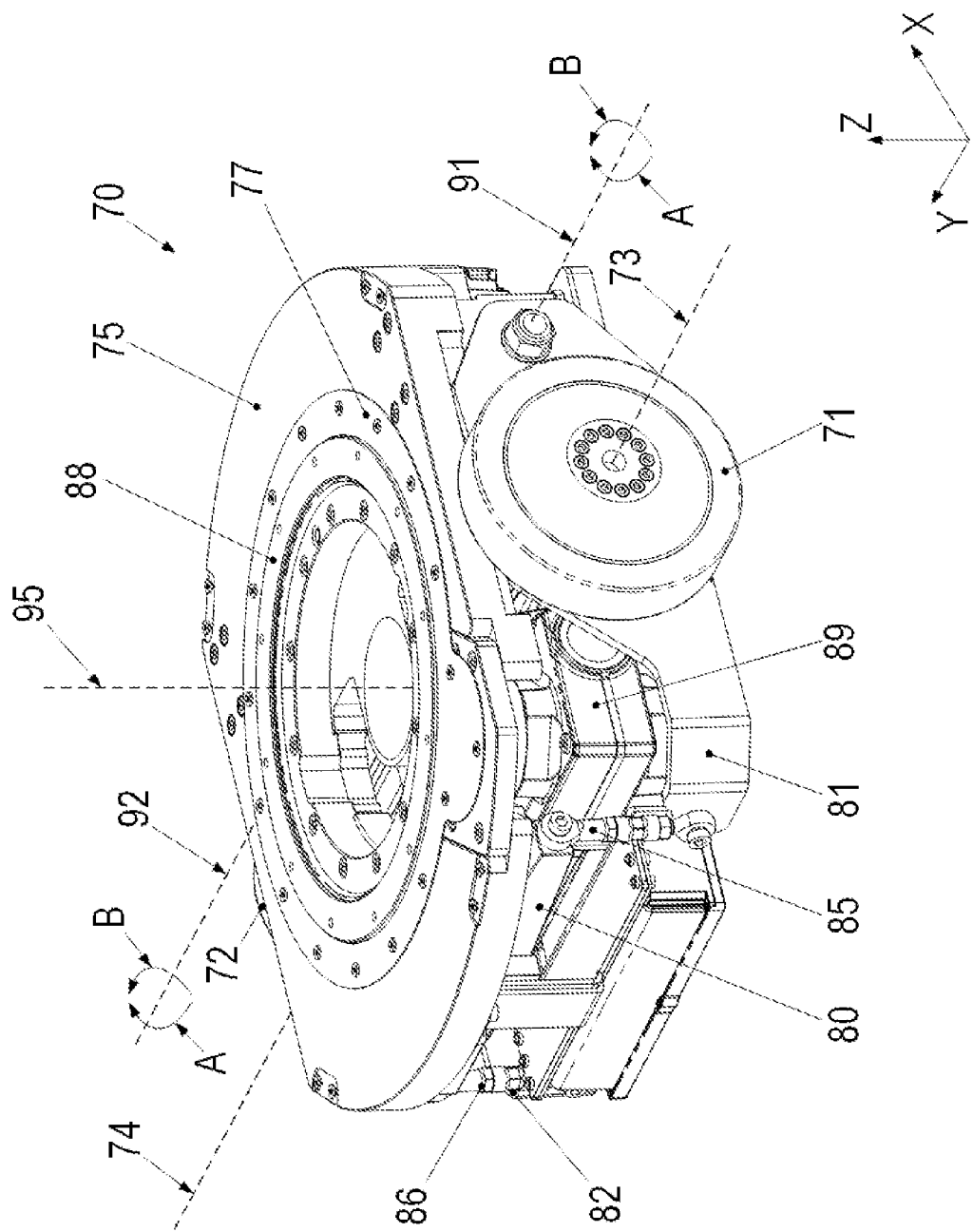
FIG. 4 is a perspective view of a drive unit.

FIG. 4 is a perspective view of a drive unit 70. The drive unit 70 includes an actuator motor for driving the drive frame 75 relative to the swivel 88 about the steering axis 95. The actuator motor 89 is disposed in a stationary manner on the drive frame 75 and operationally connected to a gearbox, by which the actuator motor 89 drives the drive frame 75 relative to the swivel 88.

The gearbox includes a pinion 97 disposed on the drive frame 75 in a stationary manner and a crown gear 98. The crown gear 98 is disposed on the swivel 88 in a stationary manner. The pinion 97 meshes with the crown gear 98. As illustrated, the pinion 97 and the crown gear 98 are covered by a cover panel 77 disposed on the drive frame 75 in a stationary manner.

Figure 5:
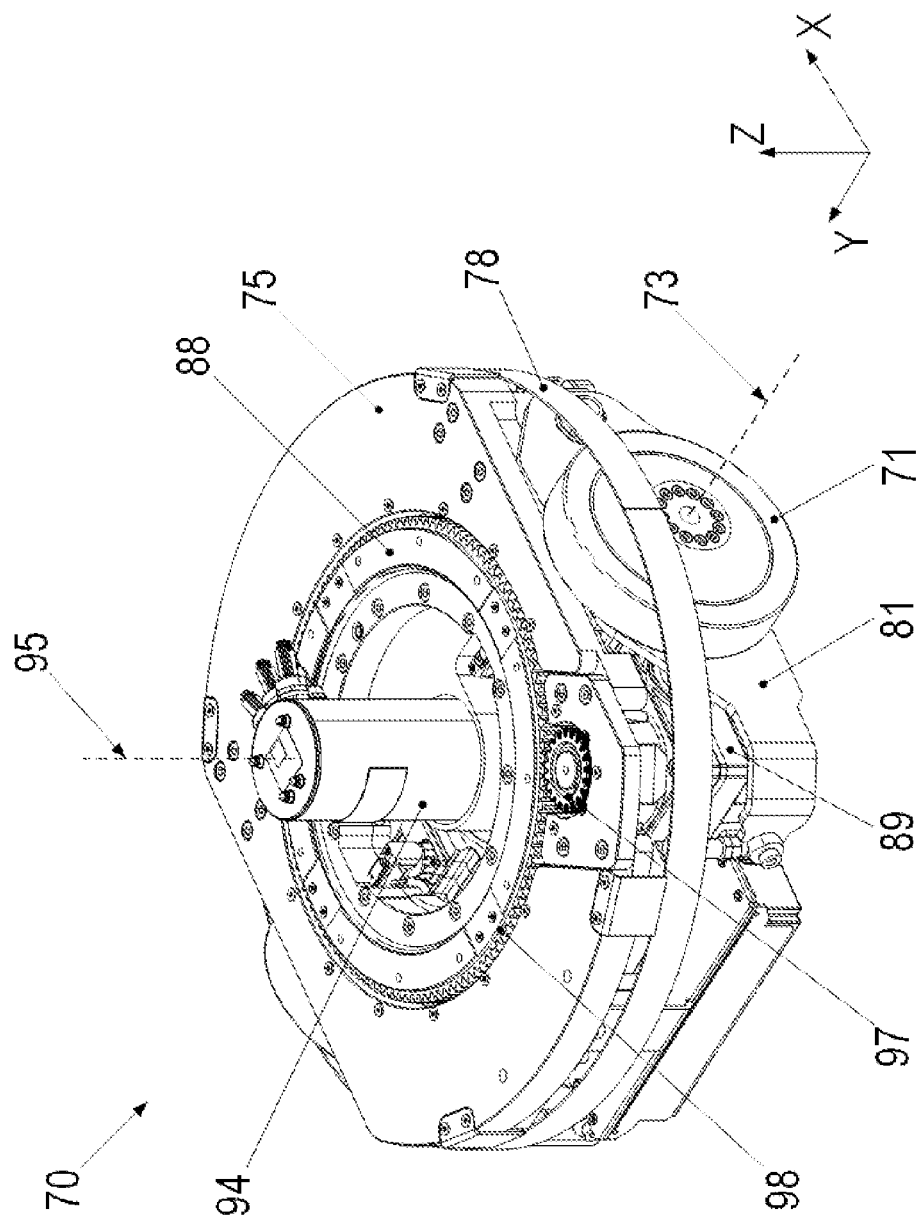
FIG. 5 is a perspective view of a drive unit.

FIG. 5 is a perspective view of a drive unit 70. The drive unit 70 illustrated in FIG. 5 substantially corresponds to the drive unit 70 illustrated in FIG. 4. The following primarily addresses the differences between the drive units 70.

In the illustration of the drive unit 70, the cover panel 77 is removed. The pinion 97 of the gearbox and the crown gear 98 of the gearbox are thus visible. The actuator motor 89 drives the pinion 97, and the pinion meshes with the crown gear 98.

The drive unit 70 includes a rotary transmitter 94 including an approximately rotationally symmetrical, e.g., cylindrical, base body. A cylinder axis of the base body of the rotary transmitter 94 extends in the vertical direction Z and is aligned with the steering axis 95.

The rotary transmitter 94 is disposed on the drive frame 75 and is pivotable relative to the crown gear 88 about the steering axis 95. It is also possible that the rotary transmitter 94 is disposed on the crown gear 88 in a stationary manner and is pivotable relative to the drive frame 75 about the steering axis 95.

The rotary transmitter 94 includes slip rings by which electrical energy and data can be transmitted from the drive frame 75 to the crown gear 88 and to the swing frame 14. Electrical energy and data can also be transmitted from the crown gear 88 and from the swing frame 14 to the drive frame 75 by the slip rings.

The drive unit 70 further includes a support panel 78 disposed on the drive frame 75 in a stationary manner. The support panel 78 is thereby implemented approximately rotationally symmetrically about the steering axis 95 and encloses the drive frame 75 nearly concentrically.

LIST OF REFERENCE CHARACTERS

10 Mobile transport system
12 Vehicle frame
13 Swing axis
14 Swing frame
20 Receiving unit
21 First inductive sensor
41 First support wheel
42 Second support wheel
51 First axis of rotation
52 Second axis of rotation
61 First pivot axis
62 Second pivot axis
70 Drive unit
71 First drive wheel
72 Second drive wheel
73 First drive axis
74 Second drive axis
75 Drive frame
77 Cover panel
78 Support panel
80 Rocker
81 First swing arm
82 Second swing arm
85 First strut
86 Second strut
88 Swivel
89 Actuator motor
90 Coupling axis
91 First swing axis
92 Second swing axis
94 Rotary transmitter
95 Steering axis
97 Pinion
98 Crown gear
A First pivot direction
B Second pivot direction
S Lateral direction
T Base direction
X Length direction
Y Transverse direction
Z Vertical direction

The invention claimed is:

1. A mobile transport system for transporting objects, comprising
   a vehicle frame;
   a swing frame pivotable about a swing axis relative to the vehicle frame;

a pair of first rotatably supported support wheels arranged on the vehicle frame;
a pair of second rotatably supported support wheels arranged on the swing frame;
a first drive wheel rotatable about a first drive axis extending in a transverse direction;
a drive unit arranged on the swing frame and including a drive frame; and
a second drive wheel rotatable about a second drive axis extending in the transverse direction;
wherein the first drive wheel is rotatably supported on a first swing arm pivotable about a first swing axis relative to the drive frame, and the second drive wheel is rotatably supported on a second swing arm pivotable about a second swing axis relative to the drive frame;
wherein the first swing arm and the second swing arm are coupled to each other by a coupling unit; and
wherein a pivot motion of the first swing arm about the first swing axis in a first pivot direction results in a pivot motion of the second swing arm about the second swing axis in a second pivot direction directed opposite the first pivot direction.

2. The mobile transport system according to claim 1, wherein the first drive axis and the second drive axis are displaceable relative to each other perpendicular to the transverse direction.

3. The mobile transport system according to claim 1, wherein the first swing axis extends in the transverse direction, the second swing axis extends in the transverse direction, and/or the first swing axis and the second swing axis are aligned with each other.

4. The mobile transport system according to claim 1, wherein the coupling unit includes a rocker pivotable about a coupling axis, a first strut, and a second strut, the first swing arm is connected to the rocker by the first strut, and the second swing arm is connected to the rocker by the second strut.

5. The mobile transport system according to claim 4, wherein the coupling axis extends in a longitudinal direction arranged perpendicular to the transverse direction.

6. The mobile transport system according to claim 1, wherein the drive unit includes a first drive motor adapted to drive the first drive wheel and a second drive motor adapted to drive the second drive wheel, the first drive motor is arranged on the first swing arm, and the second drive motor is arranged on the second swing arm.

7. The mobile transport system according to claim 1, wherein the drive frame is pivotable about a steering axis relative to the swing frame.

8. The mobile transport system according to claim 7, wherein the steering axis extends in a vertical direction arranged perpendicular to the transverse direction.

9. The mobile transport system according to claim 7, wherein the drive unit includes a swivel attached to the swing frame, the drive frame is pivotable about the steering axis relative to the swivel, and the drive unit includes an actuator motor adapted to drive the drive frame relative to the swivel.

10. The mobile transport system according to claim 7, wherein the drive unit includes a rotary transmitter adapted to transmit electrical energy and data between the drive frame and the swing frame.

11. The mobile transport system according to claim 7, wherein a distance between the second support wheels and the swing axis in a base direction is at least approximately equal to a distance between the steering axis and the swing axis in the base direction.

12. The mobile transport system according to claim 1, wherein the first support wheels are each supported rotatably relative to the vehicle frame about a first axis of rotation extending in a horizontal direction and are pivotable relative to the vehicle frame about a first pivot axis extending in a vertical direction, and/or the second support wheels are each supported rotatably relative to the vehicle frame about a second axis of rotation extending in a horizontal direction and are pivotable relative to the vehicle frame about a second pivot axis extending in a vertical direction; and
wherein the vertical direction extends perpendicular to the transverse direction.

13. The mobile transport system according to claim 1, wherein a braking device is arranged on each of the two support wheels adapted to brake a rotation of the corresponding second support wheel about a second axis of rotation extending in a horizontal direction.

14. The mobile transport system according to claim 1, wherein the drive wheels are arranged between the first support wheels and the second support wheels in a base direction.

15. The mobile transport system according to claim 1, wherein a receiving unit is arranged on the drive frame, to which energy is transferrable inductively from a charging unit.

16. The mobile transport system according to claim 1, wherein at least one inductive sensor adapted to detect a magnetic field of a particularly linear conductor is arranged on the drive frame.

17. The mobile transport system according to claim 15, wherein at least one inductive sensor adapted to detect a magnetic field of a particularly linear conductor is arranged on the drive frame.

18. The mobile transport system according to claim 1, wherein the first support wheels are each supported rotatably relative to the vehicle frame about a first axis of rotation extending in a horizontal direction and are pivotable relative to the vehicle frame about a first pivot axis extending in a vertical direction perpendicular to the transverse direction.

19. The mobile transport system according to claim 1, wherein the second support wheels are each supported rotatably relative to the vehicle frame about a second axis of rotation extending in a horizontal direction and are pivotable relative to the vehicle frame about a second pivot axis extending in a vertical direction perpendicular to the transverse direction.

20. The mobile transport system according to claim 18, wherein the second support wheels are each supported rotatably relative to the vehicle frame about a second axis of rotation extending in the horizontal direction and are pivotable relative to the vehicle frame about a second pivot axis extending in the vertical direction.

* * * * *